(12) United States Patent  (10) Patent No.: US 7,805,039 B2
Sanders et al.  (45) Date of Patent: Sep. 28, 2010

(54) SINGLE MODE OPTICAL FIBER WITH IMPROVED BEND PERFORMANCE

(75) Inventors: Paul E. Sanders, Madison, CT (US); Edward M. Dowd, Madison, CT (US); Brian J. Pike, Wallingford, CT (US)

(73) Assignee: Weatherford/Lamb, Inc., Houston, TX (US)

( * ) Notice: Subject to any disclaimer, the term of this patent is extended or adjusted under 35 U.S.C. 154(b) by 139 days.

(21) Appl. No.: 11/744,327

(22) Filed: May 4, 2007

(65) Prior Publication Data

US 2008/0273849 A1 Nov. 6, 2008

(51) Int. Cl.
*G02B 6/02* (2006.01)
(52) U.S. Cl. .......................................... 385/123; 65/397
(58) Field of Classification Search ................. 385/123, 385/127, 142
See application file for complete search history.

(56) References Cited

U.S. PATENT DOCUMENTS

| 4,217,027 | A | * | 8/1980 | MacChesney et al. | 385/123 |
|---|---|---|---|---|---|
| 4,336,049 | A | * | 6/1982 | Takahashi et al. | 65/390 |
| 4,378,987 | A | * | 4/1983 | Miller et al. | 65/418 |
| 4,395,270 | A | * | 7/1983 | Blankenship et al. | 65/403 |
| 4,494,968 | A | * | 1/1985 | Bhagavatula et al. | 65/386 |
| 4,610,709 | A | * | 9/1986 | Kawauchi et al. | 65/397 |
| 4,675,038 | A | * | 6/1987 | Ainslie et al. | 65/426 |
| 4,804,247 | A | * | 2/1989 | Kyoto et al. | 385/142 |
| 4,810,276 | A | * | 3/1989 | Gilliland | 65/421 |
| 4,822,399 | A | * | 4/1989 | Kanamori et al. | 65/398 |
| 4,968,339 | A | * | 11/1990 | Miller et al. | 65/397 |
| 4,969,941 | A | * | 11/1990 | Kyoto et al. | 65/391 |
| 5,055,121 | A | * | 10/1991 | Kanamori et al. | 65/398 |
| 5,076,824 | A | * | 12/1991 | Miller | 65/412 |
| 5,090,979 | A |  | 2/1992 | Le Sergent et al. | |
| 5,163,987 | A | * | 11/1992 | Ishiguro et al. | 65/397 |
| 5,732,178 | A |  | 3/1998 | Terasawa et al. | |
| 5,995,695 | A | * | 11/1999 | Aikawa et al. | 385/123 |
| 6,131,415 | A | * | 10/2000 | Chang et al. | 65/391 |
| 6,266,467 | B1 | * | 7/2001 | Kato et al. | 385/123 |
| 6,333,283 | B1 | * | 12/2001 | Urano et al. | 501/54 |
| 6,343,175 | B1 | * | 1/2002 | Sasaoka | 385/123 |

(Continued)

FOREIGN PATENT DOCUMENTS

JP 2004338958 12/2004

OTHER PUBLICATIONS

GB Search Report from Application No. GB0808040.0 dated Sep. 3, 2008.

*Primary Examiner*—Charlie Peng
*Assistant Examiner*—Peter Radkowski
(74) *Attorney, Agent, or Firm*—Patterson & Sheridan, LLP

(57) ABSTRACT

Methods and apparatus relate to optical fibers suitable for use in sensing applications exposed to radiation environments. The fibers include a core of pure silica or chlorine doped silica surrounded by a fluorinated silica cladding. These glasses for the core and cladding utilize dopants that resist radiation-induced attenuation. A two step process for forming the cladding can achieve necessary concentrations of the fluorine by performing a soot deposition process in a different environment from a consolidation process where the soot is sintered into a glass. Concentration of fluorine doped into the cladding layer enables obtaining a numerical aperture that confines a mono-mode of the fiber to resist bend-induced attenuation. Dimensions of the fiber further facilitate bending ability of the fiber.

8 Claims, 3 Drawing Sheets

U.S. PATENT DOCUMENTS

| | | | |
|---|---|---|---|
| 6,449,415 B1* | 9/2002 | Sasaoka | 385/123 |
| 6,574,408 B2 | 6/2003 | Lemaire et al. | |
| 6,681,072 B2 | 1/2004 | Nagayama et al. | |
| 6,783,898 B2* | 8/2004 | Berkey et al. | 430/5 |
| 6,987,918 B1* | 1/2006 | Bickham | 385/127 |
| 7,076,139 B1* | 7/2006 | Aikawa et al. | 385/123 |
| 7,088,900 B1* | 8/2006 | Mishra | 385/142 |
| 7,089,765 B2* | 8/2006 | Schaper et al. | 65/397 |
| 7,103,251 B2* | 9/2006 | Bickham et al. | 385/127 |
| 7,203,407 B2* | 4/2007 | Berkey et al. | 385/123 |
| 7,280,728 B2* | 10/2007 | Berkey et al. | 385/123 |
| 7,313,312 B2* | 12/2007 | Kimball et al. | 385/142 |
| 7,336,877 B2* | 2/2008 | Bickham | 385/127 |
| 7,382,957 B2* | 6/2008 | Chen et al. | 385/123 |
| 2001/0017967 A1* | 8/2001 | Hirano et al. | 385/123 |
| 2001/0031119 A1* | 10/2001 | Kato et al. | 385/123 |
| 2002/0012511 A1* | 1/2002 | Kato et al. | 385/123 |
| 2002/0073740 A1* | 6/2002 | Dawes et al. | 65/397 |
| 2002/0136515 A1* | 9/2002 | Schaper et al. | 385/123 |
| 2004/0042759 A1* | 3/2004 | Park et al. | 385/142 |
| 2005/0063663 A1* | 3/2005 | Anderson et al. | 385/142 |
| 2005/0244119 A1* | 11/2005 | Sasaki et al. | 385/123 |
| 2005/0257571 A1* | 11/2005 | Koaizawa et al. | 65/397 |
| 2005/0271347 A1* | 12/2005 | Kimball et al. | 385/142 |
| 2005/0286849 A1* | 12/2005 | Bickham | 385/127 |
| 2006/0088261 A1* | 4/2006 | Berkey et al. | 385/123 |
| 2006/0088262 A1* | 4/2006 | Berkey et al. | 385/125 |
| 2007/0177846 A1* | 8/2007 | Chen et al. | 385/125 |
| 2007/0266738 A1* | 11/2007 | Gallagher et al. | 65/393 |
| 2007/0274666 A1* | 11/2007 | Aikawa et al. | 385/142 |
| 2008/0050086 A1* | 2/2008 | Bickham et al. | 385/142 |
| 2008/0080823 A1* | 4/2008 | Gray et al. | 385/123 |
| 2008/0107386 A1* | 5/2008 | Kudou et al. | 385/126 |
| 2008/0124028 A1* | 5/2008 | Bickham et al. | 385/55 |
| 2008/0131066 A1* | 6/2008 | Bickham et al. | 385/125 |

* cited by examiner

FIG. 1
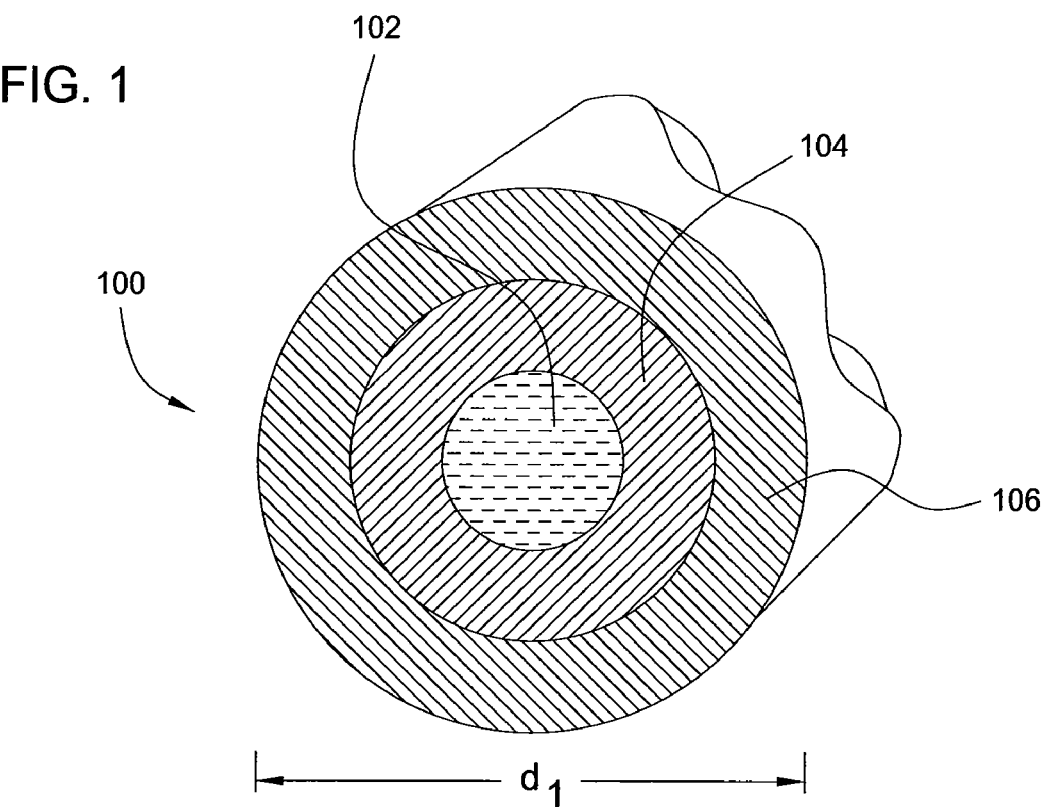
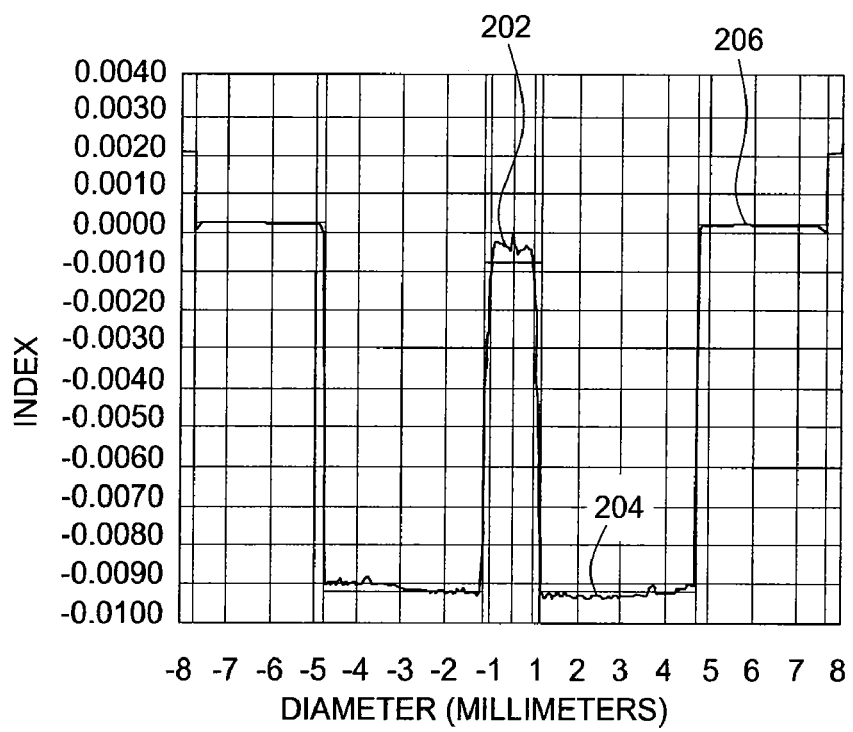
FIG. 2

US 7,805,039 B2

SINGLE MODE OPTICAL FIBER WITH IMPROVED BEND PERFORMANCE

GOVERNMENT RIGHTS IN THIS INVENTION

This invention was made with U.S. government support via the Navy under contract number N00173-04C-6024. The U.S. government has certain rights in this invention.

BACKGROUND OF THE INVENTION

1. Field of the Invention

Embodiments of the invention generally relate to optical fibers that are suitable for use in sensing applications exposed to radiation environments.

2. Description of the Related Art

Interferometer and grating based optical sensors rely on light transmission through single mode optical fibers. A fiber optic gyroscope (FOG) exemplifies one type of sensor in which light is guided through a sensing coil of fiber and then detected to determine angular rotation of the FOG based on modulation of the light detected. However, packaging and deployment of optical sensors frequently subjects the fiber to bending that can detrimentally affect both optical and mechanical properties of the fiber. Furthermore, the fibers may include glass index-modifying dopants such as germanium and phosphorus that sensitize the glass leading to high attenuation or even total darkening when operating in harsh environments that expose the fiber to nuclear radiation and hydrogen. Sensing applications in such harsh environments utilizing any prior available fiber suffer from one or both of these problems associated with the fiber.

Therefore there exists a need for optical fibers with improved performance characteristics, such as resistance to bend-induced attenuation and radiation-induced attenuation, and methods of manufacturing these optical fibers.

SUMMARY OF THE INVENTION

According to some embodiments, an optical waveguide includes a core formed of one of silica without dopants and silica doped with chlorine, and a cladding surrounding the core and formed of silica doped with fluorine such that one or more of fluorine and chlorine are the only dopants present in the core and the cladding, wherein the cladding has a first refractive index depressed at least 0.008 relative to a second refractive index of the core.

For some embodiments, a method of forming an optical waveguide includes depositing at a first temperature a silica soot layer inside a substrate tube using a gas flow of a silicon containing halide and oxygen, consolidating the soot layer at a second temperature higher than the first temperature, wherein the consolidating occurs in an environment of a substantially pure fluorine precursor gas to produce a fluorine doped cladding glass, and depositing a silica layer onto the cladding glass to provide a core glass.

In some embodiments, an optical waveguide includes a core formed by glass made of one of pure silica and silica doped only with chlorine, an inner cladding layer surrounding the core and formed by glass made of silica doped only with fluorine, wherein the inner cladding layer has a first refractive index depressed at least 0.008 relative to a second refractive index of the core, and an outer cladding layer formed by glass made of one of pure silica and silica doped only with fluorine, wherein dimensions of the core and the cladding layers define a mode field diameter for single mode propagation through the waveguide that has an outermost glass diameter of 78 to 82 microns.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1 is a cross section of an optical fiber in accordance with embodiments of the invention.

FIG. 2 is a refractive index profile across a preform for the optical fiber shown in FIG. 1.

DETAILED DESCRIPTION

Figure 3:
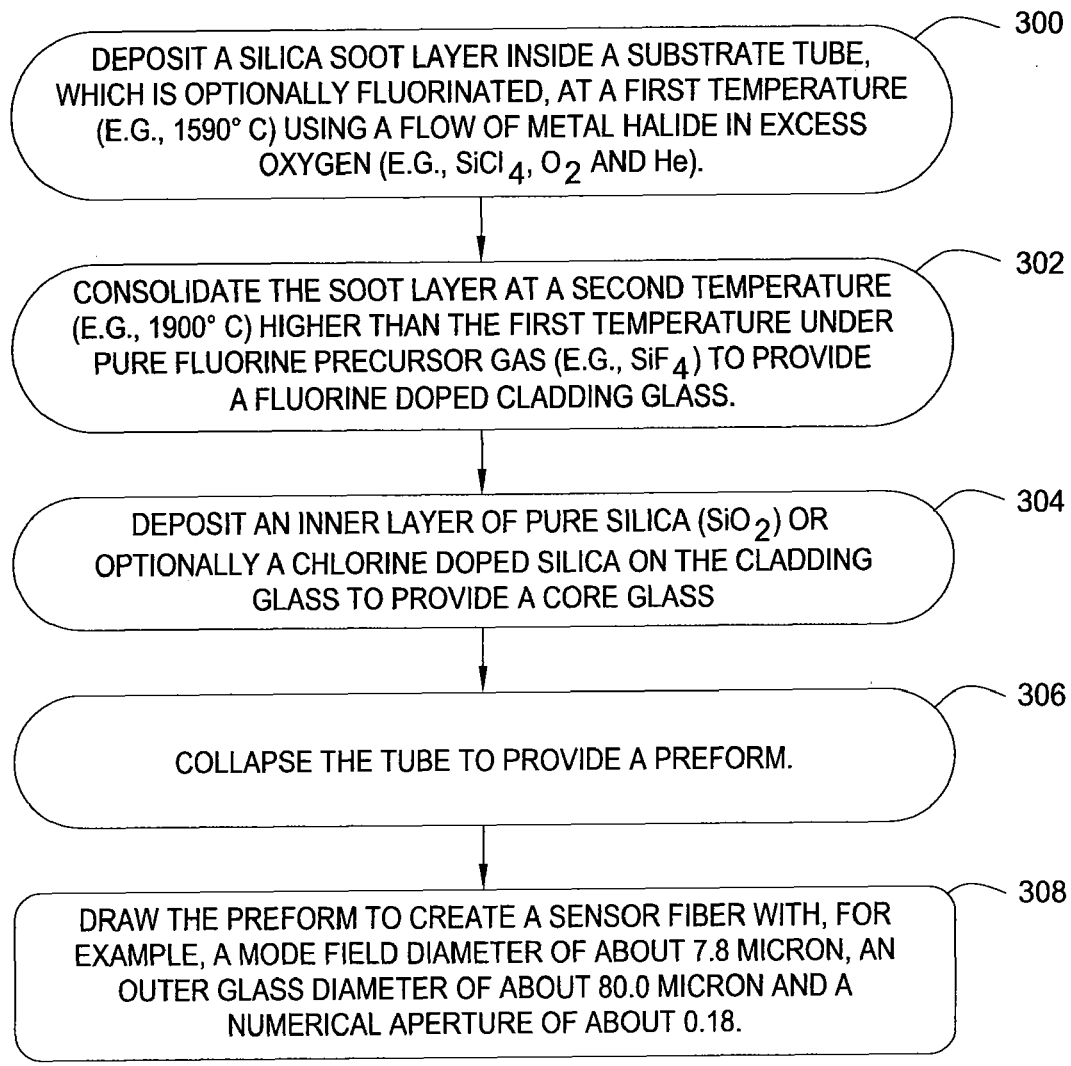
FIG. 3 is a flow chart illustrating a method of manufacturing optical fiber in accordance with embodiments of the invention.

Embodiments of the invention relate to optical fibers suitable for use in sensing applications exposed to radiation environments. The fibers include a core of pure silica or chlorine doped silica surrounded by a fluorinated silica cladding. These glasses for the core and cladding utilize dopants that resist radiation-induced attenuation. A two step process for forming the cladding can achieve necessary concentrations of the fluorine by performing a soot deposition process in a different environment from a consolidation process where the soot is sintered into a glass. Concentration of fluorine doped into the cladding layer enables obtaining a numerical aperture that confines a mono-mode of the fiber to resist bend-induced attenuation. Dimensions of the fiber further facilitate bending ability of the fiber.

FIG. 1 shows a cross section of an optical fiber 100 with a core 102 for guiding light propagating through the fiber 100, a cladding layer 104 surrounding the core 102, and an outer substrate layer 106. An outer diameter ($d_1$) of the outer substrate layer 106 may be less than 120 microns, less than 100 microns, or about 78 to about 82 microns. The outer substrate layer 106 defines outermost glass of the fiber 100 and may be in direct contact with a coating (not shown) such as a polymer. Relative to telecommunication fibers that typically have an outer glass diameter of 125 microns, the fiber 100 enables bending around diameters that are smaller since stress in the fiber 100 from tension/compression caused by the bending increases with larger diameters.

To further improve bending ability of the fiber 100, dimensions and optical characteristics of the core 102 and the cladding layer 104 may make the fiber 100 single mode with the mode confined to resist bend-induced attenuation. For example, a mode field diameter of the fiber 100 may be about 7.8 microns at an operating wavelength nominally at 1550 nm. A refractive index difference, in some embodiments, of at least 0.008 or at least 0.009 between the core 102 and the cladding layer 104 creates a numerical aperture of about 0.18 that facilitates in confining the mode propagating along the fiber 100. As a comparison, conventional telecommunication fibers have a larger mode field diameter of 11.5 microns and a lower numerical aperture of 0.11.

The fiber 100 lacks constituents such as germanium and phosphorus in the core 102 and the cladding layer 104 that can lead to several light absorbing defects when exposed to radiation and hydrogen. For some embodiments, pure silica ($SiO_2$) or chlorine doped silica forms the core 102. Fluorine (F) doped silica makes up the cladding layer 104 to lower the refractive index of the cladding layer 104 relative to the refractive index of pure silica or chlorine doped silica of the core 102. This amount of refractive index depression corresponds to quantity of fluorine dopant incorporated into the cladding layer 104. Embodiments of the invention thus improve fluorine incorporation levels in the cladding layer 104 to achieve the aforementioned mode parameters and numerical apertures that aid in confining the mode.

FIG. 2 illustrates a refractive index profile across a preform (Example 1) from which the optical fiber 100 is drawn. A central peak 202 corresponds to what becomes the core 102 and represents the refractive index of pure silica at about −0.0005. A trough 204 bounds the central peak 202. The trough 204 at about −0.009 characterizes the refractive index of fluorine doped silica that develops into the cladding layer 104. An edge plateau 206 represents the refractive index at around 0.0 of a substrate tube made of pure silica that forms the substrate layer 106 of the fiber 100.

FIG. 3 shows a flow chart illustrating a method of manufacturing the optical fiber 100 by an improved modified chemical vapor deposition (MCVD) technique. It will be appreciated that conventional MCVD as discussed herein is exemplified in U.S. Pat. No. 4,217,027 to MacChesney, et al, the disclosure of which is incorporated herein in its entirety. As will be discussed herein below in more detail, conventional MCVD is insufficient to produce the embodiments of the invention. At soot deposition step 300, gasses including a metal-halide in excess oxygen ($O_2$) and other atmospheric gases such as helium (He) mix inside a rotating substrate tube, which is formed of silica that is optionally fluorinated. During the soot deposition step 300, heating the substrate tube at a first temperature causes a silica soot to form on the inside surface of the substrate tube due to reaction of the gasses. A heat zone or burner traversing the substrate tube maintains the first temperature sufficient to allow oxidation of the metal-halide but below a threshold heat required for fusing or sintering of the silica soot.

Next, a consolidation step 302 separate and independent of the soot deposition step 300 fuses the silica soot layer into glass under pure fluorine precursor gas. The consolidation step 302 occurs in the presence of the fluorine precursor gas and at a second temperature, which is higher than the first temperature and sufficient to consolidate the silica soot. Unlike single step MCVD processing where soot deposition and consolidation along with any doping is performed under one gas-mixture flow, the consolidation step 302 occurs without the fluorine precursor gas being diluted by and in competition with other gasses in a reaction stream such as the oxygen and metal-halide required for the deposition step 300 but whose flow is shut off prior to the consolidation step 302. The consolidation step 302 occurring in only the fluorine precursor gas improves efficiency of fluorine doping and thereby increases amount of fluorine incorporated into the cladding layer relative to fluorine doping introduced as part of the gas mixture in the single step MCVD. Further, intermediary thermal and/or atmospheric conditioning between the soot deposition step 300 and the consolidation step 302 enables adjusting atmospheric oxidation/reduction reaction conditions during consolidation to reduce or eliminate certain glass defects.

At core deposition step 304, conventional MCVD processes or MCVD techniques as described herein deposit an inner layer of pure silica on the glass formed in the consolidation step 302. For some embodiments, the inner layer may include chlorine (Cl) doping to raise the refractive index of the core and improve resistance to attenuation in hydrogen and radiation environments. Chlorine doping of the core may utilize corresponding deposition and consolidation steps as used with the cladding to enhance incorporation of the chlorine.

Collapsing step 306 involves, once deposition of the cladding and core is complete, collapsing the substrate tube to provide a preform with a consolidated structure. Drawing the preform in final fabrication step 308 produces a fiber drawn to have a diameter such as set forth herein. The final fabrication step 308 may include coating the fiber with a plastic having a diameter of about 128 microns to about 132 microns.

The Example 1 preform was prepared by the method depicted in FIG. 3 according to process settings for gas flows and temperatures as set forth in Table 1 below to produce the cladding layer. The substrate in which the cladding layer was deposited was a pure silica tube. After producing the cladding layer, the core of pure silica was deposited in a single step conventional MCVD deposition.

TABLE 1

|  | Soot Deposition Step (300) | Consolidation Step (302) |
| --- | --- | --- |
| $SiCl_4$ flow (sccm) | 400 | — |
| $SiF_4$ flow (sccm) | — | 500 |
| $O_2$ flow (sccm) | 600 | — |
| He flow (sccm) | 250 | — |
| Temperature (° C.) | 1590 | 1900 |

Figure 4:
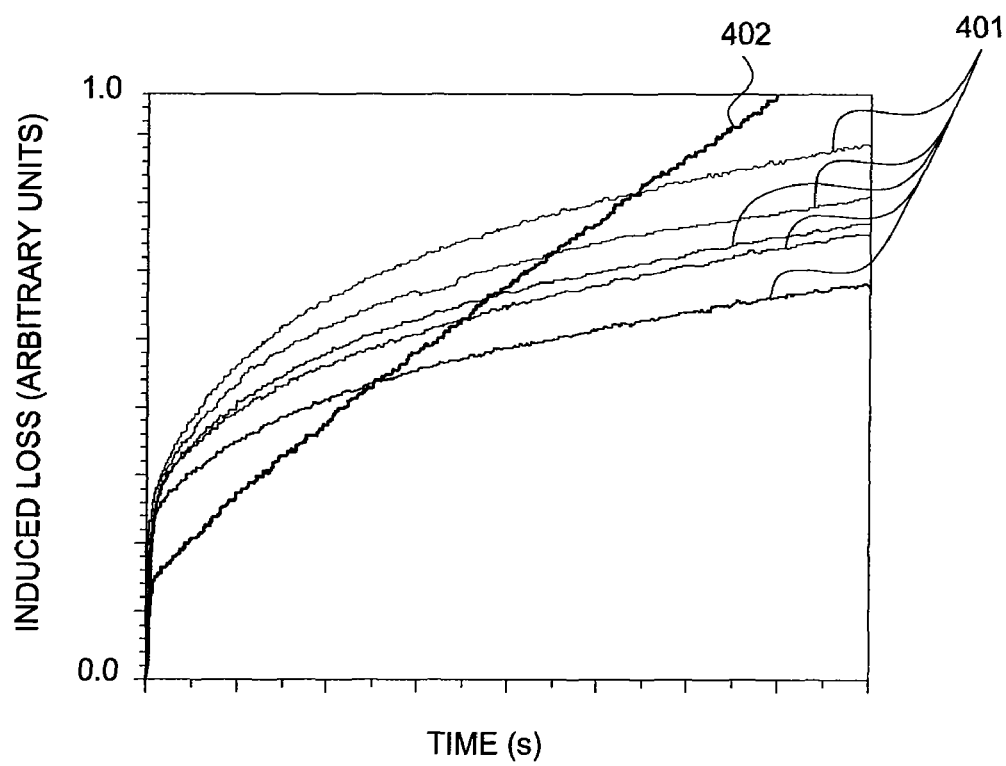
FIG. 4 is a graph of radiation-induced attenuation in five exemplary optical fibers made in accordance with embodiments of the invention as compared to a commercially available pure silica core telecommunication fiber.

FIG. 4 illustrates a graph of radiation-induced attenuation in five exemplary optical fibers made with core and cladding compositions in accordance with embodiments of the invention as compared to a commercially available pure silica core telecommunication fiber. Curves 401 representing these five fibers show growth in induced attenuation from gamma exposure (a.u. $CO_{60}$) similar if not better in response when irradiated than the pure silica core telecommunication fiber represented by reference line 402. Conventional germanium doped sensor and telecommunication fibers exhibit radiation induced attenuation orders of magnitude greater under similar irradiation, and exhibit permanent and transient hydrogen induced attenuation as a function of hydrogen partial pressure and temperature.

Figure 5:
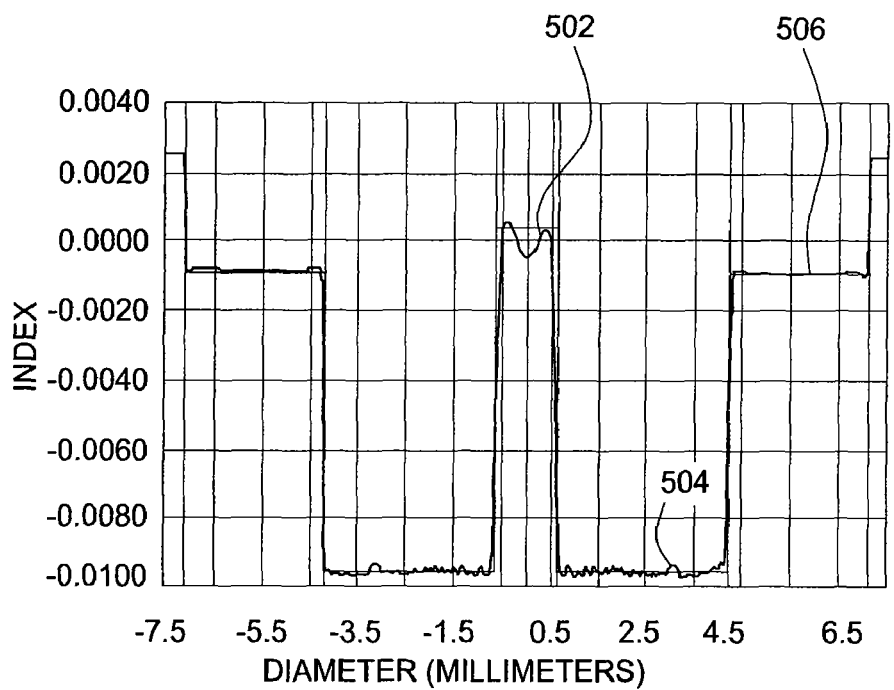
FIG. 5 is a refractive index profile across another optical fiber preform in accordance with embodiments of the invention.

FIG. 5 shows a refractive index profile across another optical fiber preform (Example 2). The Example 2 preform was prepared by the method depicted in FIG. 3 according to process settings for gas flows and temperatures as set forth in Table 1 above and Table 2 below to produce the cladding and core, respectively. The substrate in which the cladding layer was deposited was commercially available fluorinated substrate tubing having material properties of 0.2 parts per million hydroxide (OH), less than 50 ppm chlorine, and about 3500 ppm fluorine.

TABLE 2

|  | Core Soot Deposition Step | Core Consolidation Step |
|---|---|---|
| SiCl$_4$ flow (sccm) | 400 | 500 |
| O$_2$ flow (sccm) | 600 | — |
| He flow (sccm) | 250 | — |
| Temperature (° C.) | 1590 | 1900 |

Raising the refractive index of the core improves intrinsic attenuation and bend performance. Referring to the refractive index profile shown in FIG. 2 for the preform of Example 1, fluorine in the cladding layer 104 diffusing into the core 102 during the thermal collapse stage in preform processing causes the central peak 202 to be slightly depressed and less than that of the edge plateau 206 associated with the outer substrate layer 106. With the core 102 slightly depressed relative to the outer substrate layer 106, the fiber tends to be more prone to tunneling waveguide losses under micro- and macro-bending. In some embodiments, chlorine doping of the silica core can bring the index to match that of the outer silica layer, and furthermore, use of fluorinated substrate tubing can yield an improved waveguide design illustrated by the Example 2. As shown in FIG. 5, the chlorine doped core refractive index 502 being raised above that of the outer layer refractive index 506 leads to improved attenuation and bend loss since any light leaked out of the core tends to be reflected back into the core rather than being grabbed by the substrate layer. Further, the cladding layer refractive index 504 remains depressed relative to the core and also the substrate layer that has less fluorine doping than the cladding layer.

Various aspects of the preforms or fibers described herein modify one or more of the core, the cladding layer or the substrate layer to achieve desired sensor suitable optical fibers. The examples illustrate some combinations of these modifications which may be interchanged or omitted, for some embodiments, to create additional configurations of cores, claddings and substrates such as described herein. In some embodiments, fibers may contain additional layers other than the core, cladding and substrate, such as two distinct cladding layers between the core and the substrate. In addition, some embodiments utilize outside vapor deposition (OVD) processes analogous to the MCVD technique to achieve fibers with similar results. While the foregoing is directed to embodiments of the present invention, other and further embodiments of the invention may be devised without departing from the basic scope thereof, and the scope thereof is determined by the claims that follow.

What is claimed is:

1. A method of forming an optical waveguide, comprising: depositing at a first temperature a silica soot layer inside a substrate tube using a first gas flow comprising silicon containing a halide and oxygen; consolidating the soot layer at a second temperature higher than the first temperature, wherein the consolidating occurs in an environment of a second gas flow comprising substantially pure fluorine precursor gas to produce a fluorine doped cladding glass; and depositing a chlorine-doped silica layer onto the cladding glass to provide a core glass wherein the core glass forms a solid cylinder surrounded by the cladding glass.

2. The method of claim 1, wherein the consolidating the soot layer and depositing the silica layer are selected to provide the cladding glass with a first refractive index at least 0.008 relatively lower than a second refractive index of the core glass.

3. The method of claim 1, wherein depositing the silica layer includes forming a core soot layer and then consolidating the core soot layer at a different temperature and flow parameters than during forming of the core soot layer.

4. The method of claim 1, further comprising collapsing the substrate tube after forming the cladding and core glasses to provide a preform.

5. The method of claim 4, further comprising drawing the preform to produce a single mode fiber with an outermost glass diameter of about 80 microns.

6. The method of claim 1, further comprising providing the substrate tube that is pure silica.

7. The method of claim 1, further comprising providing the substrate tube that is fluorinated silica with a fluorine concentration less than the cladding glass.

8. The method of claim 1, wherein the halide comprises a metal halide.

* * * * *